Patented Aug. 29, 1950

2,520,293

UNITED STATES PATENT OFFICE 2,520,293

MERCAPTOACETANILIDE DERIVATIVES

Ulrich Weiss, Kew Gardens, N. Y., assignor to Endo Products, Inc., Richmond Hill, N. Y., a corporation of New York No Drawing. Application January 30, 1947, Serial No. 725,267

2 Claims. (Cl. 260—516)

This invention relates to novel derivatives of aromatic amino compounds and their nuclear substituted derivatives, particularly with reference to aromatic derivatives of therapeutic and/or biological activity, for example, derivatives of sulfanilamide, the amino benzoic acids, arsanilic acid, and related compounds having the type formula:

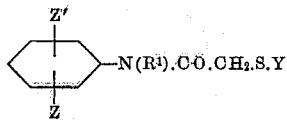

wherein:

Z is a member of the group consisting of $-[SO_2NRR']$, $-[(CH_2)_m.COX]$, $-[AsO_3RR']$ and $-[SbO_3RR']$.

Z' is a member of the group consisting of R and OR.

X is a member of the group OR, R and NRR'.

R and R', in Z, Z', and X, is each a member of the group consisting of hydrogen and an organic radical.

$R^1$ is a member of the group consisting of hydrogen and an organic radical.

$m$ is a member of the series 0 to 4.

Y is a member of the group consisting of hydrogen, a metal, an organic radical, and an organic radical containing a member of the group consisting of:

A metal substituent, OR, COOR and NRR' wherein R and R' is each a member of the group consisting of hydrogen and an organic radical.

In addition to the intrinsic physiological and/or biological activities of these novel compounds, the presence of the chemically reactive mercapto structure allows for the preparation of:

(a) Their metallic derivatives, as for example, those of mercury, cobalt, iron, gold, copper and silver; and (b) A wide variety of compounds embodying many diverse types of organic radicals.

Accordingly, among the purposes and objects of this invention may be noted the provision of a series of new compounds of the type formula above indicated.

A further object is the provision of new compounds of the type formula above indicated which, when Y is H, are readily converted by substitution of the hydrogen by metals having physiological activity such as mercury, iron, cobalt, silver, gold, copper and the like, into products of marked physiological and pharmaceutical value derived from the unique structure of these metal-containing organic molecules.

Among the specific applications of these metallo-organic compounds it is to be noted that the copper, mercury and silver derivatives are antiseptics; that the auro compounds are valuable in the treatment of arthritis; and that the iron and cobalt compounds are valuable for their influence on the hematopoietic system.

The compounds of the above general formula where Y is hydrogen are of value as antioxidants in protecting compounds such as epinephrin, vitamin A and other products which are prone to undergo oxidation in the presence of air or oxygen.

Furthermore, these mercapto compounds possess the property of modifying proteinaceous materials, whereby such proteinaceous materials are so altered in character as to make them adaptable for further chemical treatment or physical manipulations.

I have found that the compounds of the type formula given above where Y represents

—CO.NH₂— i. e., the N-(alpha carbamyl mercapto-acetyl) arylamides may be conveniently prepared by the interaction of thiocyano acetic acid with a selected aromatic amine—viz., one having the particularly desired substituents, as for example, $-SO_2NH_2$; $-COOH$, $-AsO_3H_2$, in the aromatic residue of the amine. This reaction is brought about by the dissolution of the amine in an acid medium, followed by the addition thereto of a solution of the sodium salt of thiocyano acetic acid, with resultant formation of the S-carbamyl derivative of the desired N-arylamide of mercapto acetic acid. These S-carbamyl derivatives may in turn be converted into the mercapto compounds having the type formula given above (where Y represents hydrogen) by means of heat or alkali, preferably hot dilute ammonia. The mercapto compounds may further be converted to the corresponding disulfides by the action of oxidizing agents, as for example, iodine. The mercapto compounds may also be converted to the corresponding metal mercaptides by interaction with an appropriate reagent.

This invention accordingly comprises the procedures and features of the various compositions and compounds which will be typified by those set forth in the following examples and the scope of which will be indicated in the appended claims.

Example 1

N - alpha - carbamyl - mercapto - acetyl para amino benzoic acid having the formula:

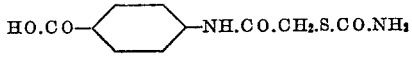

0.1 mole of p.amino benzoic acid is suspended in 100–200 cc. of water at room temperature and enough hydrochloric acid (1:1) is added to give a clear solution. Then a solution of 0.1 mole (15.7 grams) of sodium thiocyano acetate, $NaOOC.CH_2.SCN.H_2O$ is added. Crystallization of the N-carbamyl mercapto acetyl para amino benzoic acid is allowed to proceed for about two days at room temperature, after which time the compound is filtered by suction, washed well with dilute hydrochloric acid and water, and dried. The compound may be recrystallized, if desired, from acetic acid.

Example 2

N-alpha-mercapto-acetyl para amino benzoic acid having the formula:

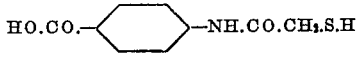

3 grams of the N-alpha carbamyl mercapto acetyl para-amino benzoic acid, the product of Example 1, are refluxed for 15 minutes with a mixture of 15 cc. of concentrated aqueous ammonia and 35 cc. of methanol. The flask is then stoppered, chilled in ice and glacial acetic acid is added to litmus acidic reaction. Dilution with water precipitates the N-alpha mercapto acetyl para amino benzoic acid which is washed with water containing a small amount of hydrochloric acid, and dried in vacuo over phosphorus pentoxide. The product may be purified by crystallization from water slightly acidified with hydrochloric acid or by high vacuum sublimation.

Example 3

N-alpha-di-thio di-acetyl-bis-para amino benzoic acid having the formula:

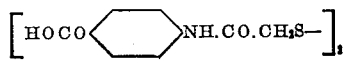

1 gram of the N-alpha mercapto acetyl para amino benzoic acid, the product of Example 2, is dissolved in methanol or ethanol and an aqueous solution of iodine in potassium iodide is added (from a buret) in very slight excess. The excess iodine is removed at once by the addition of a few drops of an aqueous solution of sodium thiosulfate and the disulfide is precipitated by the addition of water.

Example 4

N-alpha-auro mercapto acetyl para amino benzoic acid having the formula:

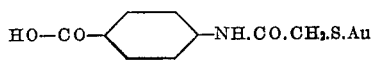

An alcoholic solution (95%) of monovalent gold, $Au^+$, is prepared by the reduction of 0.01 mole of potassium auri bromide, $KAuBr_4$. This solution is added to an alcoholic solution of 1.86 grams of N-alpha mercapto acetyl para amino benzoic acid, the product of Example 2. The gold salt of the mercapto compound appears as a white voluminous precipitate. It is collected on a filter and washed rapidly with water and ethanol. After drying in vacuo over phosphorus pentoxide it forms a yellowish powder.

Example 5

N-alpha-carbamyl-mercapto acetyl -anthranilic acid having the formula:

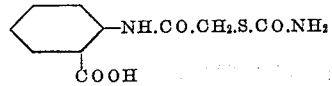

0.1 mole of anthranilic acid is suspended in 100–200 cc. of water at room temperature and enough hydrochloric acid (1:1) is added to give a clear solution. Then a solution of 0.1 mole (15.7 grams) of sodium thiocyano acetate, $NaOOC.CH_2.SCN.H_2O$ is added. A precipitate of the free base may appear which is brought back into solution by rapid addition of a sufficient quantity of dilute hydrochloric acid. Crystallization of the N-alpha-carbamyl-mercapto acetyl-anthranilic acid is allowed to proceed for about two days at room temperature, after which time the compound is filtered by suction, washed well with dilute hydrochloric acid and water, and dried. The compound may be crystallized if desired from acetic acid.

Example 6

N - alpha - mercapto acetyl - anthranilic acid having the formula:

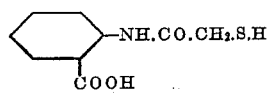

5 grams of the N-alpha-carbamyl-mercapto acetyl-anthranilic acid, the product of Example 5, are heated for 5 to 10 minutes with a mixture of 15 cc. of concentrated aqueous ammonia and 15 cc. of water. The hot mixture is rapidly filtered through a Büchner funnel into a flask containing excess ice. The filtrate is at once acidified with excess dilute hydrochloric acid. This precipitates the mercapto acetyl compound N-alpha-mercapto acetyl-anthranilic acid which is filtered by suction, washed well with water containing a small amount of hydrochloric acid and dried in vacuo over phosphorus pentoxide. The product may be purified by crystallization from water slightly acidified with hydrochloric acid or by high vacuum sublimation.

Example 7

N-alpha-di-thio-di-acetyl-bis-anthranilic acid having the formula:

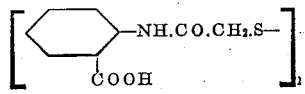

1 gram of the N-alpha-mercapto-acetyl-anthranilic acid, the product of Example 6, is dissolved in methanol or ethanol and an aqueous solution of iodine in potassium iodide is added (from a buret) in very slight excess. The excess iodine is removed at once by the addition of a few drops of an aqueous solution of sodium thiosulfate and the disulfide is precipitated by the addition of water.

Example 8

N-alpha - auro - mercapto acetyl-anthranilic acid having the formula:

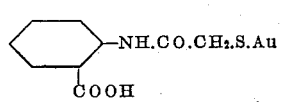

An alcoholic solution (95%) of monovalent gold, $Au^+$, is prepared by the reduction of 0.01 mole of potassium auri bromide, KAuBr₄. This solution is added to an alcoholic solution of 1.86 grams of N-alpha mercapto acetyl anthranilic acid, the product of Example 6. The gold salt of the mercapto compound, having the formula above indicated, appears as a precipitate. It is collected on a filter and washed thoroughly with water and ethanol. After drying in vacuo over phosphorus pentoxide it forms a white powder.

*Example 9*

N - alpha - carbamyl - mercapto-acetyl-meta amino benzoic acid having the formula:

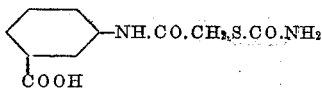

The above compound is prepared in accordance with the general method described in Example 1, except that meta amino benzoic acid is used as the initial starting material in place of the para amino benzoic acid of Example 1.

*Example 10*

N-alpha-mercapto-acetyl-meta amino benzoic acid having the formula:

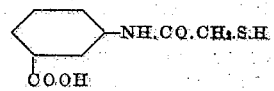

The above compound is prepared in accordance with the general method described in Example 6, except that the N-alpha-carbamyl-mercapto-acetyl meta amino benzoic acid, the product of Example 9, is used in place of the N-alpha - carbamyl-mercapto-acetyl-para amino benzoic acid utilized in Example 2.

*Example 11*

N-alpha - di - thio-di-acetyl-bis-meta amino benzoic acid having the formula:

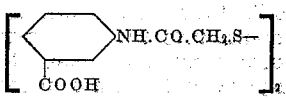

The above compound is prepared in accordance with the general method described in Example 3, except that the N-alpha-mercapto-acetyl-meta amino benzoic acid, the product of Example 10, is used as the initial starting material in place of the N-alpha-mercapto-acetyl-para amino benzoic acid utilized in Example 3.

*Example 12*

N - alpha-auro-mercapto-acetyl-meta amino benzoic acid having the formula:

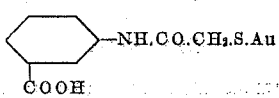

The above compound is prepared in accordance with the general method described in Example 4, except that the N-alpha-mercapto-acetyl-meta amino benzoic acid, the product of Example 11, is used as the initial starting material in place of the N-alpha-mercapto-acetyl-para amino benzoic acid which is used in Example 4.

*Example 13*

N - alpha - carbamyl - mercapto-acetyl-para amino-phenyl acetic acid having the formula:

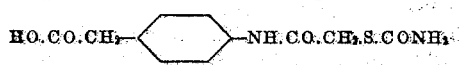

(a) The above compound is prepared in accordance with the general method described in Example 5 except that para amino phenyl acetic acid is used as the initial starting material for interaction with the sodium thiocyano acetate.

(b) In accordance with the general procedure described in Example 2, the carbamyl compound of this example is converted into the N-alpha-mercapto-acetyl-para amino-phenyl acetic acid having the formula:

(c) In accordance with the procedures hereinabove described for the conversion of the mercapto compounds into the corresponding disulfides and auro compounds, the N-alpha-mercapto-acetyl-para amino-phenyl acetic acid is converted into N-alpha-di-thio-di-acetyl-bis-para amino-phenyl acetic acid having the formula:

and (d) The N-alpha-auro-mercapto-acetyl-para amino phenyl acetic acid having the formula:

*Example 14*

N-alpha-carbamyl-mercapto-acetyl-meta amino-phenyl acetic acid having the formula:

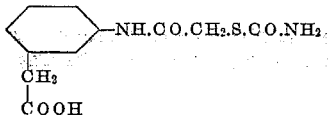

(a) The above compound is prepared in accordance with the general method described in Example 5 except that meta amino phenyl acetic acid is used as the initial starting material for interaction with the sodium thiocyano acetate.

(b) In accordance with the general procedure described in Example 2, the carbamyl compound of this example is converted into the N-alpha-mercapto-acetyl-meta amino phenyl acetic acid having the formula:

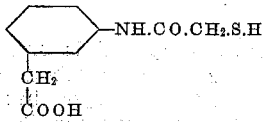

(c) In accordance with the procedures hereinabove described for the conversion of the mercapto compounds into the corresponding disulfides and auro compounds, the N-alpha-mercapto-acetyl-meta amino-phenyl-acetic acid is converted into the N-alpha-di-thio-di-acetyl-bis-meta amino phenyl acetic acid having the formula:

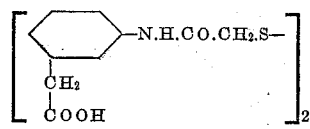

and (d) The N-alpha-auro-mercapto-acetyl-meta amino phenyl acetic acid having the formula:

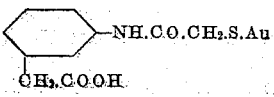

Example 15

N-alpha-carbamyl-mercapto-acetyl-para amino phenyl-propionic acid having the formula:

(a) The above compound is prepared in accordance with the general method described for the preparation of the corresponding phenyl acetic acid compound of Example 13, using para amino-phenyl-propionic acid as the initial starting material for interaction with the sodium thiocyano acetate.

(b) In accordance with the general procedure described in Example 2, the carbamyl compound of this example is converted into the N-alpha-mercapto-acetyl-para amino-phenyl - propionic acid having the formula:

(c) In accordance with the procedures hereinabove described for the conversion of the mercapto compounds into the corresponding disulfides and auro compounds, the N-alpha-mercapto-acetyl-para amino-phenyl-propionic acid is converted into the N-alpha-di-thio-di-acetyl-bis-para amino-phenyl-propionic acid having the formula:

and (d) The N-alpha-auro-mercapto-acetyl-para amino-phenyl-propionic acid having the formula:

Example 16

N-alpha-carbamyl-mercapto-acetyl-meta amino-phenyl propionic acid having the formula:

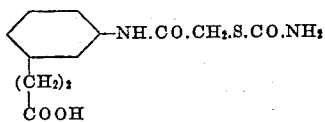

(a) The above compound is prepared in accordance with the general method described for the preparation of the corresponding phenyl acetic acid compound of Example 13, using meta amino-phenyl-propionic acid as the initial starting material for interaction with the sodium thiocyano acetate.

(b) In accordance with the general procedure described in Example 2, the carbamyl compound of this example is converted into the N-alpha-mercapto-acetyl-meta amino-phenyl - propionic acid having the formula:

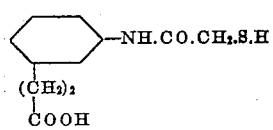

(c) In accordance with the procedures hereinabove described for the conversion of the mercapto compounds into the corresponding disulfides and auro compounds, the N-alpha-mercapto-acetyl-meta amino-phenyl-propionic acid is converted into the N-alpha-di-thio-di-acetyl-bis-meta amino-phenyl-propionic acid having the formula:

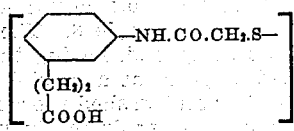

and (d) The N-alpha-auro-mercapto-acetyl-meta amino-phenyl-propionic acid having the formula:

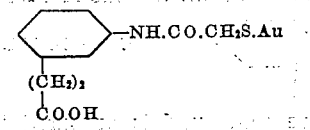

Example 17

N-alpha-carbamyl-mercapto-acetyl-para amino-ethyl benzoate having the formula:

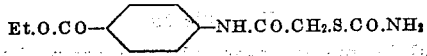

(a) The above compound is prepared in accordance with the general method described for the preparation of the N-alpha-mercapto-acetyl-para amino benzoic acid, except that ethyl para amino benzoate is used as the initial starting material for interaction with the sodium thiocyano acetate.

(b) In accordance with the general method described in Example 6, the carbamyl compound of this example is converted into the N-alpha-mermapto-acetyl-para amino-ethyl benzoate having the formula:

(c) In accordance with the procedures hereinabove described for the conversion of the mercapto compounds into the corresponding disulfides and auro compounds, the N-alpha-mercapto-acetyl-para amino-ethyl benzoate is converted into the N-alpha-di-thio-di-acetyl-bis-para amino-ethyl benzoate having the formula:

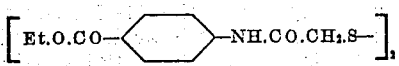

and (d) The N-alpha-auro-mercapto-acetyl-para amino-ethyl benzoate having the formula:

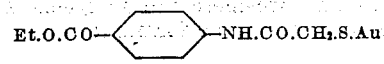

Example 18

N-alpha-carbamyl-mercapto-acetyl-ortho amino-methyl benzoate having the formula:

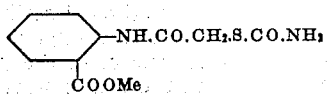

(a) The above compound is prepared in accordance with the general method described for the preparation of the N-alpha-mercapto-acetyl-ortho amino benzoic acid, except that ortho amino-methyl benzoate methyl anthranilate, is used as the initial starting material for interaction with the sodium thiocyano acetate.

(b) In accordance with the general procedure described in Example 6, the carbamyl compound of this example is converted into the N-alpha-mercapto-acetyl-ortho amino-methyl benzoate having the formula:

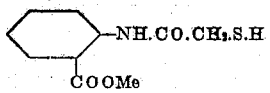

(c) In accordance with the procedures hereinabove described for the conversion of the mercapto compounds into the corresponding disulfides and auro compounds, the N-alpha-mercapto-acetyl-ortho amino-methyl benzoate is converted into the N-alpha-dithio-di-acetyl-bis-ortho amino-methyl benzoate having the formula:

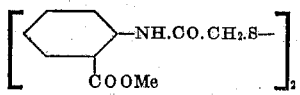

and (d) The N-alpha-auro-mercapto-acetyl-ortho amino-methyl benzoate having the formula:

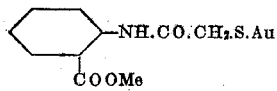

Example 19

N-alpha-carbamyl-mercapto-acetyl-meta amino-methyl benzoate having the formula:

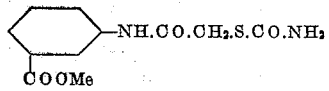

(a) The above compound is prepared in accordance with the general method for the preparation of the N-alpha-carbamyl-mercapto-acetyl-meta amino-benzoic acid, the compound of Example 9, except that meta amino-methyl benzoate is used as the initial starting material for interaction with the sodium thiocyano acetate.

(b) In accordance with the general procedure described in Example 6, the carbamyl compound of this example is converted into the N-alpha-mercapto-acetyl-meta amino-methyl benzoate having the formula:

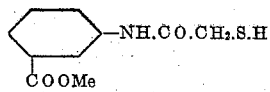

(c) In accordance with the procedures hereinabove described for the conversion of the mercapto compounds into their corresponding disulfides and auro compounds, the N-alpha-mercapto-acetyl-meta amino-methyl benzoate is converted into the N-alpha-di-thio - di - acetyl - bis - meta amino-methyl benzoate having the formula:

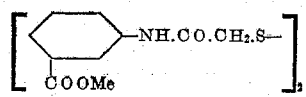

and (d) The N-alpha-auro-mercapto-acetyl-meta amino-methyl benzoate having the formula:

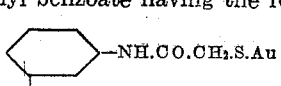

Example 20

N-alpha-carbamyl-mercapto-acetyl-meta amino-para hydroxy-methyl benzoate having the formula:

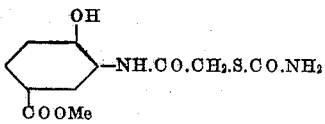

(a) The above compound is prepared in accordance with the general method described for the preparation of the N-alpha-carbamyl-mercapto-acetyl-meta amino-methyl benzoate compound of Example 19, except that orthoform, meta amino-para hydroxy-methyl benzoate is used as the initial starting material for interaction with the sodium thiocyano acetate (b) In accordance with the general procedure hereinabove described, the carbamyl compound of this example is converted into the N-alpha-mercapto-acetyl-meta amino-para hydroxy-methyl benzoate having the formula:

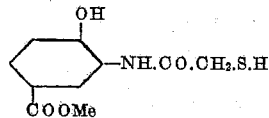

(c) In accordance with the procedures hereinabove described for the conversion of the mercapto compounds into the corresponding disulfides and auro compounds, the N-alpha-mercapto-acetyl-meta amino-para hydroxy-methyl benzoate is converted into the N-alpha-di-thio -di-acetyl-bis-meta amino-para hydroxy-methyl benzoate having the formula:

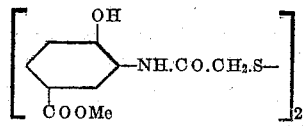

and (d) The N-alpha-auro-mercapto-acetyl-meta amino-para hydroxy-methyl benzoate having the formula:

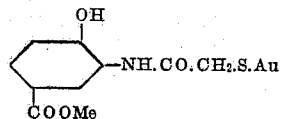

Example 21

N-alpha-carbamyl-mercapto-acetyl-para amino phenyl ethyl acetate having the formula:

(a) The above compound is prepared in accordance with the general method described for the preparation of the N-alpha-carbamyl-mercapto-acetyl-para amino phenyl acetic acid, the compound of Example 13, except that para amino phenyl ethyl acetate is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N-alpha - mercapto - acetyl para amino phenyl ethyl acetate having the formula:

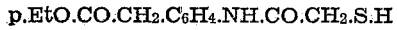

(c) N-alpha-di-thio-di-acetyl-bis para amino phenyl ethyl acetate having the formula:

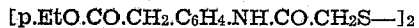

(d) N-alpha-auro-mercapto-acetyl para amino phenyl ethyl acetate having the formula:

p.EtO.CO.CH$_2$.C$_6$H$_4$NH.CO.CH$_2$.S.Au

Example 22

N-alpha-carbamyl-mercapto-acetyl-meta amino phenyl ethyl acetate having the formula:

m.EtO.CO.CH$_2$.C$_6$H$_4$NH.CO.CH$_2$.S.CO.NH$_2$ (a) The above compound is prepared in accordance with the general method described for the preparation of the N-alpha-carbamyl-mercapto-acetyl-meta amino phenyl acetic acid, the compound of Example 14, except that meta amino phenyl ethyl acetate is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N-alpha - mercapto - acetyl meta amino phenyl ethyl acetate having the formula:

m.EtO.CO.CH$_2$.C$_6$H$_4$NH.CO.CH$_2$.S.H (c) N-alpha-di-thio-di-acetyl-bis meta amino phenyl ethyl acetate having the formula:

[m.EtO.CO.CH$_2$.C$_6$H$_4$.NH.CO.CH$_2$S—]$_2$ (d) N-alpha-auro-mercapto-acetyl meta amino phenyl ethyl acetate having the formula:

m.EtO.CO.CH$_2$.C$_6$H$_4$NH.CO.CH$_2$S.Au

Example 23

N-alpha-carbamyl-mercapto-acetyl-para amino phenyl methyl propionate having the formula:

p.Me.O.CO.CH$_2$CH$_2$.C$_6$H$_4$NH.CO.CH$_2$S.CO.NH$_2$ (a) The above compound is prepared in accordance with the general method described for the preparation of the N-alpha-carbamyl-mercapto-acetyl-para amino phenyl propionic acid, the compound of Example 15, except that para amino-phenyl-methyl propionate is used as the initial starting material for the interaction with the sodium thiocyano acetate.

By like procedures as hereinabove described for the conversion of the carbamyl compounds into their corresponding mercapto, disulfide and auro compounds, there are obtained from the carbamyl compound of this example:

(b) N-alpha - mercapto - acetyl - para amino-phenyl methyl propionate having the formula:

p.MeO.CO.CH$_2$.CH$_2$.C$_6$H$_4$NH.CO.CH$_2$S.H (c) N-alpha-di-thio-di-acetyl bis para amino phenyl methyl propionate having the formula:

[p.MeO.CO.CH$_2$.CH$_2$.C$_6$H$_4$NH.CO.CH$_2$S—]$_2$ (d) N-alpha-auro-mercapto-acetyl-para amino phenyl methyl propionate having the formula:

p.MeO.CO.CH$_2$.CH$_2$.C$_6$H$_4$NH.CO.CH$_2$.S.Au

Example 24

N-alpha-carbamyl-mercapto-acetyl-meta amino phenyl ethyl propionate having the formula:

m.EtO.CO.CH$_2$.CH$_2$.C$_6$H$_4$.NH.CO.CH$_2$S.CO.NH$_2$ (a) The above compound is prepared in accordance with the general method described for the preparation of the N-alpha-carbamyl-mercapto-acetyl-meta amino phenyl propionic acid, the compound of Example 16, except that meta amino phenyl ethyl propionate is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N-alpha - mercapto - acetyl - meta amino phenyl ethyl propionate having the formula:

m.EtO.CO.CH$_2$.CH$_2$.C$_6$H$_4$.NH.CO.CH$_2$S.H (c) N-alpha-di-thio-di-acetyl bis meta amino phenyl ethyl propionate having the formula:

[m.EtO.CO.CH$_2$.CH$_2$.C$_6$H$_4$.NH.CO.CH$_2$S—]$_2$ (d) N-alpha-auro-mercapto-acetyl-meta amino phenyl ethyl propionate having the formula:

m.EtO.CO.CH$_2$.CH$_2$.C$_6$H$_4$.NH.CO.CH$_2$.S.Au

Example 25

N-alpha-carbamyl-mercapto-acetyl-para amino benzamide having the formula:

p.NH$_2$.CO.C$_6$H$_4$.NH.CO.CH$_2$S.CO.NH$_2$ (a) The above compound is prepared in accordance with the general method described for the preparation of the N-alpha-carbamyl-mercapto-acetyl-para amino benzoic acid, the compound of Example 1, except that para amino benzamide is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N - alpha - mercapto - acetyl - para amino benzamide having the formula:

p.NH$_2$CO.C$_6$H$_4$NH.CO.CH$_2$S.H (c) N-alpha-di-thio-di-acetyl-bis-para amino benzamide having the formula:

[p.NH$_2$CO.C$_6$H$_4$.NH.CO.CH$_2$S—]$_2$ (d) N-alpha-auro-mercapto-acetyl-para amino benzamide having the formula:

p.NH$_2$.CO.C$_6$H$_4$NH.CO.CH$_2$S.Au

Example 26

N-alpha-carbamyl-mercapto-acetyl-ortho amino benzamide having the formula:

o.NH$_2$.CO.C$_6$H$_4$NH.CO.CH$_2$S.CO.NH$_2$ (a) The above compound is prepared in accordance with the general method described for the preparation of the N-alpha-mercapto-acetyl-para amino benzamide, the compound of Example 25, except that ortho amino benzamide is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N-alpha - mercapto - acetyl - ortho amino benzamide having the formula:

o.NH$_2$CO.C$_6$H$_4$NH.CO.CH$_2$S.H (c) N-alpha-di-thio-di-acetyl bis-ortho amino benzamide having the formula:

[o.NH$_2$.CO.C$_6$H$_4$NH.CO.CH$_2$S—]$_2$ (d) N-alpha-auro-mercapto-acetyl-ortho amino benzamide having the formula:

o.NH₂.CO.C₆H₄NH.CO.CH₂S.Au

*Example 27*

N - alpha - carbamyl - mercapto - acetyl-meta amino benzamide having the formula:

m.NH₂.CO.C₆H₄.NH.CO.CH₂S.CO.NH₂

(a) The above compound is prepared in accordance with the general method described for the preparation of the N-alpha-carbamyl-mercapto-acetyl-para amino benzamide, the compound of Example 25, except that meta amino benzamide is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N - alpha - mercapto-acetyl-meta amino benzamide having the formula:

m.NH₂CO.C₆H₄NH.CO.CH₂S.H (c) N-alpha-di-thio-di-acetyl-bis-meta amino benzamide having the formula:

[m.NH₂CO.C₆H₄.NH.CO.CH₂S]₂

(d) N - alpha - auro - mercapto - acetyl-meta amino benzamide having the formula:

m.NH₂.CO.C₆H₄NH.CO.CH₂S.Au

*Example 28*

N - alpha - carbamyl - mercapto - acetyl-para amino-acetophenone having the formula:

p.CH₃.CO.C₆H₄.NH.CO.CH₂S.CO.NH₂

The above compound is prepared in accordance with the general method described for the preparation of the N-alpha-carbamyl-mercapto-acetyl-para amino-benzoic acid, the compound of Example 1, except that para amino acetophenone is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N - alpha - mercapto-acetyl-para amino-acetophenone having the formula:

p.CH₃.CO.C₆H₄.NH.CO.CH₂S.H (c) N-alpha-di-thio-di-acetyl-bis-para amino-acetophenone having the formula:

[p.CH₃.CO.C₆H₄.NH.CO.CH₂S.]₂

(d) N - alpha - auro - mercapto - acetyl-para amino-acetophenone having the formula:

p.CH₃.CO.C₆H₄.NH.CO.CH₂S.Au

*Example 29*

N - alpha - carbambyl - mercapto-acetyl-ortho amino-acetophenone having the formula:

o.CH₃.CO.C₆H₄.NH.CO.CH₂S.CO.NH₂

The above compound is prepared in accordance with the general method described for the preparation of the N-alpha-carbamyl-mercapto-acetyl-anthranilic acid, the compound of Example 5, except that ortho amino acetophenone is used as the initial starting material for the interaction with the sodium thiocyano acetate.

By like procedures as hereinabove described for the conversion of the carbamyl compounds into their corresponding mercapto-, disulfide and auro compounds there are obtained from the carbamyl compound of this example:

(b) N-alpha-mercapto-acetyl-ortho amino-acetophenone having the formula:

o.CH₃.CO.C₆H₄.NH.CO.CH₂.S.H.

(c) N - alpha - di - thio - di - acetyl-bis-ortho amino acetophenone having the formula:

[o.CH₃.CO.C₆H₄.NH.CO.CH₂.S.]₂

(d) N - alpha - auro - mercapto - acetyl-ortho amino acetophenone having the formula:

o.CH₃.CO.C₆H₄.NH.CO.CH₂.S.Au

*Example 30*

N - alpha - carbamyl - mercapto - acetyl-meta amino acetophenone having the formula:

m.CH₃.CO.C₆H₄.NH.CO.CH₂.S.CO.NH₂

The above compound is prepared in accordance with the general method described for the preparation of the N-alpha-carbamyl-mercapto-acetyl-meta amino benzoic acid, the compound of Example 9, except that meta amino acetophenone is used as the initial starting material for the interaction with the sodium thiocyano acetate.

By like procedures as hereinabove described for the conversion of the carbamyl compounds into their corresponding mercapto, disulfide and auro compounds there are obtained from the carbamyl compound of this example:

(b) N - alpha - mercapto - acetyl-meta amino acetophenone having the formula:

m.CH₃.CO.C₆H₄.NH.CO.CH₂.S.H (c) N-alpha-di-thio-di-acetyl-bis-meta amino acetophenone having the formula:

[m.CH₃.CO.C₆H₄.NH.CO.CH₂.S.]₂

(d) N - alpha - auro - mercapto - acetyl - meta amino acetophenone having the formula:

m.CH₃.CO.C₆H₄.NH.CO.CH₂.S.Au

*Example 31*

N - alpha - carbamyl - mercapto - acetyl - para amino-phenyl acetone having the formula:

p.CH₃.CO.CH₂.C₆H₄.NH.CO.CH₂.S.CO.NH₂

(a) The above compound is prepared in accordance with the general method described for the preparation of the N-alpha-carbamyl-acetyl-para amino acetophenone, the compound of Example 28, except that para amino phenyl acetone is used as the initial starting material for the interaction with the sodium thiocyano acetate.

By like procedures as hereinabove described for the conversion of the carbamyl compounds into their corresponding mercapto, disulfide and auro compounds, there are obtained from the carbamyl compound of this example:

(b) N - alpha - mercapto - acetyl - para amino phenyl acetone having the formula:

p.CH₃.CO.CH₂.C₆H₄.NH.CO.CH₂.S.H (c) N-alpha-di-thio-di-acetyl-bis-para amino phenyl acetone having the formula:

[p.CH₃.CO.CH₂.C₆H₄.NH.CO.CH₂.S—]₂

(d) N - alpha - auro - mercapto - acetyl - para amino phenyl acetone having the formula:

p.CH₃.CO.CH₂.C₆H₄.NH.CO.CH₂.S.Au

By like procedures as hereinabove described, there are obtained from meta amino phenyl acetone as the initial starting material for interaction with the sodium thiocyano acetate, the following:

N - alpha - carbamyl - mercapto - acetyl - meta amino phenyl acetone.

N-alpha-mercapto-acetyl-meta amino phenyl acetone.

N - alpha - di - thio - di-acetyl-bis-meta amino phenyl acetone.

N - alpha - auro - mercapto-acetyl-meta amino phenyl acetone.

*Example 32*

N - alpha - carbamyl - mercapto - acetyl - para amino phenyl acetamide having the formula:

p.NH$_2$.CO.CH$_2$.C$_6$H$_4$.NH.CO.CH$_2$.S.CO.NH$_2$ (a) The above compound is prepared in accordance with the general method described for the preparation of the N-alpha-carbamyl-mercapto-acetyl-para amino benzamide, the product (a) of Example 25, except that para amino phenyl acetamide is used as the initial starting material for the interaction with the sodium thiocyano acetate.

By like procedures as hereinabove described for the conversion of the carbamyl compounds into their corresponding mercapto, disulfide and auro compounds, there are obtained from the carbamyl compound of this example:

(b) N - alpha - mercapto - acetyl - para amino phenyl acetamide having the formula:

p.NH$_2$.CO.CH$_2$.C$_6$H$_4$.NH.CO.CH$_2$.S.H (c) N - alpha - di - thio - di - acetyl - bis - para amino phenyl acetamide having the formula:

[p.NH$_2$.CO.CH$_2$.C$_6$H$_4$.NH.CO.CH$_2$.S—]$_2$ (d) N - alpha - auro - mercapto - acetyl - para amino phenyl acetamide having the formula:

p.NH$_2$.CO.CH$_2$.C$_6$H$_4$.NH.CO.CH$_2$.S.Au

By like procedures as hereinabove described, there are obtained from meta amino phenyl acetamide as the initial starting material for interaction with the sodium thiocyano acetate, the following:

N - alpha - carbamyl - mercapto - acetyl - meta amino phenyl acetamide.

N-alpha-mercapto-acetyl-meta amino phenyl acetamide.

N - alpha - di - thio - di - acetyl - bis - meta amino phenyl acetamide.

N - alpha - auro - mercapto-acetyl-meta amino phenyl acetamide.

By using the amino phenyl propionamides corresponding to the amino phenyl acetamides as hereinabove described as the initial starting materials for interaction with the sodium thiocyano acetate, there are obtained the following carbamyl, mercapto, disulfide and auro compounds:

N-alpha-carbamyl-mercapto-acetyl-para amino phenyl propionamide.

N-alpha-mercapto-acetyl-para amino phenyl propionamide.

N - alpha - di - thio - di-acetyl-bis-para amino phenyl propionamide.

N - alpha - auro - mercapto-acetyl-para amino phenyl propionamide.

N-alpha-carbamyl-mercapto-acetyl-ortho amino phenyl propionamide.

N-alpha-mercapto-acetyl-ortho amino phenyl propionamide.

N - alpha - di - thio - di-acetyl-bis-ortho amino phenyl propionamide.

N - alpha - auro - mercapto-acetyl-ortho amino phenyl propionamide.

N-alpho-carbamyl-mercapto-acetyl-meta amino phenyl propionamide.

N-alpha-mercapto-acetyl-meta amino-phenyl propionamide.

N - alpha - di - thio - di-acetyl-bis-meta amino phenyl propionamide.

N - alpha - auro - mercapto-acetyl-meta amino phenyl propionamide.

*Example 33*

N-alpha-carbamyl-mercapto-acetyl-para amino propiophenone having the formula:

CH$_3$.CH$_2$.CO.C$_6$H$_4$.NH.CO.CH$_2$.S.CO.NH$_2$ (a) The above compound is prepared in accordance with the general method described for the preparation of the N-alpha-carbamyl-mercapto-acetyl-para amino acetophenone, compound (a) of Example 28, except that para amino propiophenone is used as the initial starting material for the interaction with the sodium thiocyano acetate.

By like procedures as hereinabove described for the conversion of the carbamyl compounds into their corresponding mercapto, disulfide and auro compounds, there are obtained from the carbamyl compound of this example the following:

N-alpha-mercapto-acetyl-para amino propiophenone.

N-alpha-di-thio-di-acetyl-bis-para amino propiophenone.

N - alpha - auro - mercapto-acetyl-para amino propiophenone.

By using the ortho and meta amino propiophenones respectively as the initial starting materials for interaction with the sodium thiocyano acetate, there are obtained the following compounds analogous to the hereinabove described compounds of this example:

N-alpha-carbamyl-mercapto-acetyl-ortho amino propiophenone.

N-alpha-mercapto-acetyl-ortho amino propiophenone.

N - alpha - di - thio - di-acetyl-bis-ortho amino propiophenone.

N - alpha - auro - mercapto-acetyl-ortho amino propiophenone.

N-alpha-carbamyl-mercapto-acetyl-meta amino propiophenone.

N-alpha-mercapto-acetyl-meta amino propiophenone.

N - alpha - di - thio - di-acetyl-bis-meta amino propiophenone.

N - alpha - auro - mercapto-acetyl-meta amino propiophenone.

By using the para, ortho and meta amino butyro-phenones respectively as the initial starting materials for interaction with the sodium thiocyano acetate, there are obtained the following carbamyl, mercapto, disulfide and auro compounds corresponding to those derived from the use of the amino propiophenones as the starting materials:

N-alpha-carbamyl-mercapto-acetyl-para amino butyro-phenone.

N-alpha-mercapto-acetyl-para amino butyro-phenone.

N - alpha-di-thio-di-acetyl-bis-para amino butyro-phenone.

N-alpha-auro-mercapto-acetyl-para amino butyro-phenone.

N-alpha-carbamyl-mercapto-acetyl-ortho amino butyro-phenone.
N-alpha-mercapto-acetyl-ortho amino butyro-phenone.
N-alpha-di-thio-di-acetyl-bis-ortho amino butyro-phenone.
N - alpha - auro - mercapto-acetyl-ortho amino butyro-phenone.
N - alpha - carbamyl - mercapto - acetyl-meta amino butyro-phenone.
N-alpha-mercapto-acetyl-meta amino butyro-phenone.
N-alpha-di-thio-di-acetyl-bis-meta amino butyro-phenone.
N - alpha - auro-mercapto-acetyl-meta amino butyro-phenone.

By using the para and meta amino benzyl acetones (p.-, m.- $NH_2.C_6H_4.CH_2.CH_2.CO.CH_3$) respectively as the initial starting materials for interaction with the sodium thiocyano acetate as hereinabove described there are obtained the following:

N - alpha - carbamyl - mercapto - acetyl-para amino benzyl acetone.
N-alpha-mercapto-acetyl-para amino benzyl acetone.
N-alpha-di-thio-di-acetyl-bis-para amino benzyl acetone.
N - alpha - auro-mercapto-acetyl-para amino benzyl acetone.
N - alpha - carbamyl - mercapto - acetyl-meta amino benzyl acetone.
N-alpha-mercapto-acetyl-meta amino-benzyl acetone.
N-alpha-di-thio-di-acetyl-bis-meta amino benzyl acetone.
N - alpha - auro-mercapto-acetyl-meta amino benzyl acetone.

By using the para and meta amino benzyl ethyl ketones (p.-, m.- $NH_2.C_6H_4.CH_2.CO.CH_2.CH_3$) as the initial starting materials for interaction with the sodium thiocyano acetate as hereinabove described there are obtained the following:

N - alpha - carbamyl - mercapto - acetyl - para amino benzyl ethyl ketone.
N-alpha-mercapto-acetyl-para amino benzyl ethyl ketone.
N - alpha - di - thio - di-acetyl-bis-para amino benzyl ethyl ketone.
N - alpha - auro-mercapto-acetyl-para amino benzyl ethyl ketone.
N - alpha - carbamyl - mercapto - acetyl-meta amino benzyl ethyl ketone.
N-alpha-mercapto-acetyl-meta amino benzyl ethyl ketone.
N-alpha-di-thio-di-acetyl-bis-meta amino benzyl ethyl ketone.
N - alpha - auro-mercapto-acetyl-meta amino benzyl ethyl ketone.

*Example 34*

(a) N4 - alpha - carbamyl-mercapto-sulfanilamide having the formula:

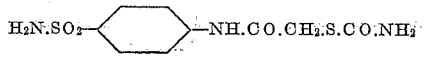

0.1 mole of sulfanilamide is suspended in water and brought into solution by the addition of the necessary amount of dilute hydrochloric acid. A solution of 0.1 mole (15.7 grams) sodium thiocyano acetate (Na.OOC.CH₂.SCN.H₂O) is added. A precipitate of sulfanilamide forms which is rapidly brought back into solution by the addition of a sufficient quantity of dilute hydrochloric acid. Crystallization of the carbamyl compound soon sets in and is allowed to proceed at room temperature for about two days. After this time, the product is collected on a filter, washed well with dilute hydrochloric acid and with water, and dried. It is very little soluble in organic solvents and may be recrystallized from a large volume of acetic acid.

(b) N4 - alpha-mercapto-acetyl-sulfanilamide having the formula:

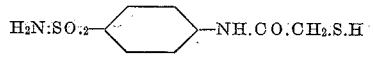

5. grams of N4-alpha-carbamyl-mercapto-acetyl sulfanilamide are refluxed with 15 cc. of concentrated ammonia and 15 cc. of water for 15 minutes. The solution is filtered by suction into a flask containing excess ice. Dilute hydrochloric acid is added at once in slight excess, and the compound is filtered with suction, washed well with water containing a small quantity of hydrochloric acid and dried in vacuo over phosphorus pentoxide. The product may be recrystallized from water containing a small amount of hydrochloric acid.

(c) N4-alpha-(di-thio-di-acetyl) bis sulfanilamide having the formula:

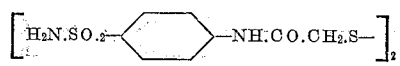

1 gram of N4-alpha-mercapto-acetyl sulfanilamide, the product (a) of this example, is dissolved in ethanol, and an aqueous solution of iodine in potassium iodide is added from a buret in small excess. This excess is removed at once by the addition of a few drops of an aqueous solution of sodium thiosulfate and the disulfide is precipitated by the addition of water.

(d) N4-alpha-auro-mercapto-acetyl sulfanilamide having the formula:

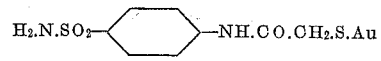

A 95% alcoholic solution of monovalent gold is prepared by the reduction of 0.01 gram of potassium auribromide, KAuBr₄, and a solution of 0.01 mole of N4-alpha-mercapto-acetyl-sulfanilamide, the compound (b) of this example, is added thereto. The precipitate of the gold salt is collected on a filter (or by centrifugation) and washed exhaustively with water, ethanol and pentane. After drying in vacuo over phosphorus pentoxide, it forms a light yellow powder.

By like procedures, using sulfapyridine sulfathiazole, and sulfadiazine, there are prepared compounds analogous to those derived from sulfanilamide, viz. the N4-alpha-carbamyl-mercapto-acetyl sulfathiazole having the formula:

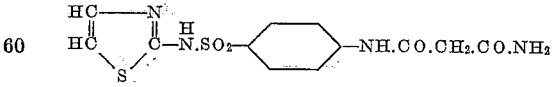

and the related mercapto compound, the disulfide and the auro derivative:

N4-alpha-mercapto-acetyl sulfathiazole.
N4-alpha-di-thio-di-acetyl-bis-sulfathiazole.
N4-alpha-auro-mercapto-acetyl-sulfathiazole.
N4-alpha-carbamyl-mercapto-acetyl-sulfapyridine having the formula:

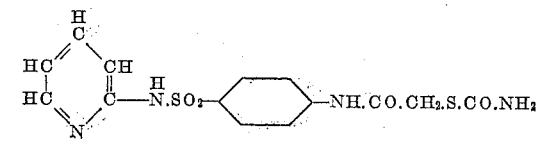

and the related mercapto compound, the disulfide and the auro derivative:

N4-alpha-mercapto-acetyl-sulfapyridine.
N4-alpha-di-thio-di-acetyl-bis-sulfapyridine.
N4-alpha-auro-mercapto-acetyl-sulfapyridine.
N4-alpha-carbamyl - mercapto-acetyl-sulfadiazine having the formula:

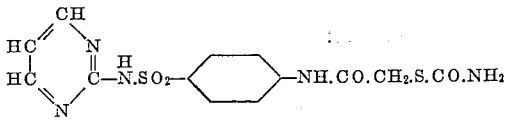

and the related mercapto compound, the disulfide and the auro derivative:

N4-alpha-mercapto-acetyl-sulfadiazine.
N4-alpha-di-thio-di-acetyl-bis-sulfadiazine.
N4-alpha-auro-mercapto-acetyl-sulfadiazine.

Example 35

Alpha - carbamyl - mercapto - acetyl - arsanilic acid having the formula:

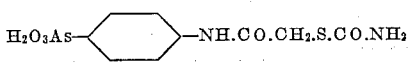

0.1 mole of arsanilic acid is suspended in 200 cc. of water and brought into solution by the addition of dilute hydrochloric acid. An aqueous solution of 15.7 grams of sodium thiocyano acetate is added. Any precipitate of arsanilic acid is brought back into solution by the addition of the necessary amount of dilute hydrochloric acid, whereupon crystallization of the desired compound starts soon. The product is filtered by suction, washed well with dilute hydrochloric acid, followed by water, and dried.

Crystallization from a large volume of 0.1 N hydrochloric acid converts it into a nice crystalline powder.

The carbamyl compound is converted into the corresponding mercapto compound having the formula:

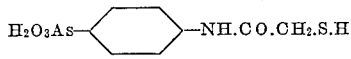

the disulfide having the formula:

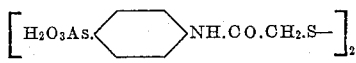

and the auro compound having the formula:

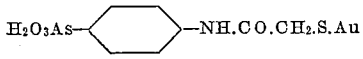

Example 36

S-benzyl-N-alpha-mercapto-acetyl-para amino benzoic acid having the formula:

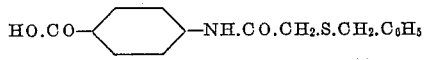

An alcoholic solution of 0.1 mole of the corresponding carbamyl compound, the product of Example 1, is refluxed for one hour with 0.1 mole of benzyl chloride and a quantity of alcoholic caustic potash corresponding to three equivalents. The mixture is cooled. The precipitate which forms is removed by filtration and the filtrate is diluted with excess water and acidified.

The precipitate of the S-benzyl compound, the product of this example, is collected on a filter, washed well with water and dried. It may be recrystallized from acetic acid.

Example 37

N-alpha-mercapto-acetyl-anthranilic acid-S- acetic acid (mono-N-anthranilyl-thiodiglycolic acid) having the formula:

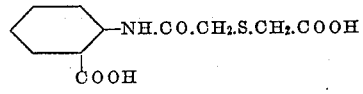

0.1 mole of N-alpha-carbamyl-mercapto-acetyl anthranilic acid, the product of Example 5, is refluxed in ethanol with 0.1 mole of monochloro acetic acid and 0.3 mole equivalents of alcoholic alkali for one hour. The mixture is cooled, filtered, and the filtrate is concentrated to a small volume under reduced pressure. Excess water is added and the solution is acidified with excess dilute hydrochloric acid, resulting in the precipitation of the compound of this example which is collected on a filter, washed with water and dried. It may be recrystallized from acetone.

The product of this example may also be prepared as above described by using as the initial starting material N-alpha-mercapto-acetyl-anthranilic acid, the product of Example 6 and reacting the same with only two equivalents of alkali.

Example 38

Methyl-N-alpha-carbamyl - mercapto - acetyl N-methyl anthranilate having the formula:

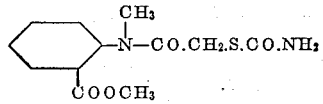

0.1 gram of the methyl ester of N-methyl anthranilic acid is suspended in water and brought into solution by the addition of the necessary amount of dilute hydrochloric acid. An aqueous solution of 0.1 mole (15.7 grams) of sodium thiocyano acetate is added and the reaction is allowed to proceed for about two days. The compound of this example is isolated by filtration, washed well with dilute acid and with water, and dried. It may be recrystallized from acetic acid.

The compound of this example yields on treatment in the same way as the anthranilic acid derivative, the product of Example 5, the mercapto compound having the formula:

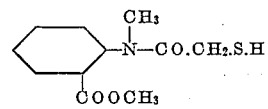

from which in turn there are prepared the corresponding disulfide and auro compound.

Example 39

N-alpha-allyl-mercapto - acetyl - anthranilic acid having the formula:

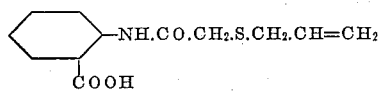

0.1 mole (25 grams) of carbamyl-mercapto-acetyl-anthranilic acid, the compound of Example 5, is dissolved in 850 cc. of ethanol by refluxing. 16.83 grams (0.3 mole) of potassium hydroxide, dissolved in 50 cc. of 50% ethanol are added, followed by the addition of 12.1 grams of allyl bromide diluted with ethanol. A white precipitate appears at once. The mixture is refluxed for thirty minutes. It is next diluted with excess water, chilled in ice and filtered. The addition of hydrochloric acid (1:1) results in the precipitation of the compound of this example which is filtered by suction, washed well with water and dried over phosphorus pentoxide in vacuo.

*Example 40*

N-alpha-allyl-mercapto-acetyl-para amino benzoic acid having the formula:

This compound is prepared in the same way as its ortho isomer, the product of Example 39, except that the carbamyl-mercapto-acetyl-para amino benzoic acid is used as the initial starting material.

*Example 41*

N-alpha-allyl-mercapto-acetyl-para amino phenyl acetic acid having the formula:

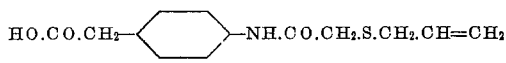

0.1 mole (26.8 grams) of N-alpha-carbamyl-mercapto-acetyl-para amino-phenyl-acetic acid, the product of Example 13, is suspended in one liter of ethanol and a solution of 0.3 mole (16.8 grams) of caustic potash in 50 cc. of 50% ethanol is added. The solution is filtered to remove any insoluble material and 12.1 grams of allyl bromide is added and the mixture refluxed for one hour. The mixture is next cooled and filtered. The filtrate is concentrated in vacuo. The residue is dissolved in a small amount of water, treated with charcoal and the filtrate is chilled in ice and acidified with dilute hydrochloric acid (1:1). The compound of this example is thus precipitated. It is filtered with suction, washed cautiously with water and dried in vacuo over phosphorus pentoxide. It may be recrystallized from benzene.

The three allyl compounds of the foregoing examples may also be prepared by starting with the preformed mercapto compounds and using only two equivalents of caustic potash.

I claim:

1. Compounds having the general formula:

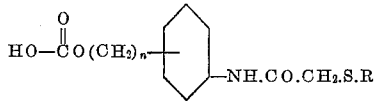

wherein R is a member of the group consisting of hydrogen and carbamyl and $n$ is a member of the series 0 to 4.

2. The compound having the formula:

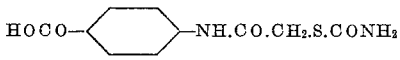

ULRICH WEISS.

REFERENCES CITED

The following references are of record in the file of this patent:

UNITED STATES PATENTS

| Number | Name | Date |
|---|---|---|
| 2,113,330 | Mannes et al. | Apr. 5, 1938 |
| 2,115,394 | Mannes et al. | Apr. 26, 1938 |
| 2,412,700 | Weissberger et al. | Dec. 7, 1946 |
| 2,418,947 | Lott et al. | Apr. 15, 1947 |

FOREIGN PATENTS

| Number | Country | Date |
|---|---|---|
| 79,152 | Sweden | Feb. 21, 1929 |
| 555,141 | Great Britain | Aug. 5, 1943 |

OTHER REFERENCES

Beckurts et al.; Jour. Prokt. Chemie, vol. 174 (N. S.) 1902, p. 174.